United States Patent [19]
Bellet et al.

[11] Patent Number: 5,796,006
[45] Date of Patent: Aug. 18, 1998

[54] METHOD AND APPARATUS FOR MEASURING VIBRATIONS

[75] Inventors: Serge Bellet, Chateauneuf-les-Martigues; Jean-Luc Brouillet, Lavera; Daniel Bazzoni, Martigues, all of France

[73] Assignee: Naphtachimie, Courbevoie, France

[21] Appl. No.: 775,711

[22] Filed: Dec. 17, 1996

[30] Foreign Application Priority Data

Dec. 22, 1995 [FR] France .................................. 95 15870

[51] Int. Cl.⁶ .................................................. G01H 11/00
[52] U.S. Cl. .................................................. 73/661; 73/658
[58] Field of Search .................................. 73/660, 661, 644, 73/19.03, 658, 659, 35.09, 35.11, 649; 376/250, 252

[56] References Cited

U.S. PATENT DOCUMENTS

| | | | |
|---|---|---|---|
| 3,242,723 | 3/1966 | Evans | 73/71.5 |
| 3,555,297 | 1/1971 | Pierson | 310/325 |
| 3,819,740 | 6/1974 | Hori | 240/679 |
| 4,266,421 | 5/1981 | McDougal | 73/35.11 |
| 5,201,227 | 4/1993 | Iinuma et al. | 73/655 |
| 5,257,545 | 11/1993 | Au-Yang | 73/597 |
| 5,450,753 | 9/1995 | Maynor et al. | 73/644 |
| 5,469,744 | 11/1995 | Patton et al. | 73/644 |
| 5,524,475 | 6/1996 | Kolpak et al. | 73/19.03 |
| 5,546,809 | 8/1996 | Cotton | 73/660 |

FOREIGN PATENT DOCUMENTS 9211931 7/1992 WIPO.

*Primary Examiner*—Hezron E. Williams
*Assistant Examiner*—Nashmiya Fayyaz
*Attorney, Agent, or Firm*—Ladas & Parry

[57] ABSTRACT

The technical field of the invention is the field of methods and apparatus for thermally cracking chemicals. The present invention provides a method and apparatus for measuring the vibration of a duct in which there flows at least one fluid and which is disposed inside a thermal enclosure at high temperature, wherein a vibration sensor is used that is located inside the enclosure.

8 Claims, 3 Drawing Sheets

5,796,006

METHOD AND APPARATUS FOR MEASURING VIBRATIONS

The present invention relates to a method and to apparatus for measuring vibrations of a duct conveying one or more substances, and situated in a furnace such as a thermal cracking furnace or a heat exchange device.

The technical field of the invention is the field of methods and apparatuses for thermally treating products such as chemicals.

BACKGROUND OF THE INVENTION

Application WO 92/11931 (Naphtachimie et al.) discloses a method and apparatus for manufacturing one or more chemical products in which a chemical reaction is performed by causing one or more reagents to be conveyed inside a duct disposed in a radiation zone of a furnace, the duct being subjected to vibration to limit the deposition of by-products on the inside wall of the duct.

OBJECTS AND SUMMARY OF THE INVENTION

The present invention seeks to improve methods and apparatuses of the kind described in that document by providing a method and an apparatus for measuring vibration of a duct situated in an enclosure (referred to as a thermal enclosure or as a heat exchange enclosure) that is raised to a high temperature and within which fluid substances such as chemical reagents flow.

In a first aspect of the invention, in a method of measuring vibration in a duct disposed in a thermal enclosure and in which there flows at least one fluid, use is made of a vibration sensor disposed inside the thermal enclosure.

Vibration sensor is intended for taking measurement of the duct vibrations, preferably for measuring low frequency transverse vibrations of the duct. Duct vibration measurements may consist in duct wall displacement measurements taken by a displacement sensor, or may consist in duct wall speed measurements taken by a speed sensor, or may consist in duct wall acceleration measurements taken by an acceleration sensor, i.e. an accelerometer. Signals delivered by said sensor may be processed to determine and measure the phase, the frequency and preferably the amplitude of the signals, i.e. the amplitude of the duct vibrations.

In a particular embodiment, measurements are taken of the vibration of a duct conveying one or more fluids (gases and/or liquids), which duct is located in a furnace fitted with burners and is disposed in a radiation zone of the furnace at a temperature that is high, i.e. not less than 300° C. and preferably not less than 500° C., while generally being not greater than 1500° C. Preferably, use is made of a sensor that is responsive to the mechanical vibration of the duct, which vibration is transmitted directly to the sensor by conduction and/or by contact, e.g. an accelerometer, and preferably a piezoelectric type accelerometer.

The fluids carried by the duct whose vibration is to be measured may be constituted, for example, by compounds containing hydrogen and carbon, in particular hydrocarbons, petroleum products, or indeed substances such as castor oil.

In preferred implementations of the measurement method of the invention:

said sensor is secured to a support, and said sensor support is pressed against said duct to enable and facilitate transmission of vibration by conduction from said duct to at least (an end) a portion of said support, and from said support to said sensor;

the vibration sensor is kept at a temperature lower than the temperature of the enclosure, i.e. at a temperature that is generally less than 500° C., and in particular less than 300° C.; the sensor is preferably maintained at a temperature that is less than (or about) 100° C. to 200° C., by being cooled by a cooling fluid conveyed in a support for the sensor, which cooling fluid is preferably essentially constituted by a liquid, such as water;

the signals delivered by said vibration sensor are measured (and processed) over a range of frequencies below 5000 Hz, preferably at frequencies situated in a band going from 10 Hz to 2000 Hz, e.g. in a frequency band going from 10 Hz to 1000 Hz, or more specifically from 20 Hz to 1000 Hz; this range of frequencies is generally sufficient to measure the main transverse, i.e. bending, vibrations of the duct;

a vibration sensor is located in a first cavity provided at a first end of a support for said sensor, which support is hollow, and elongate in shape, e.g. being in the form of a bar or a tube;

in the vicinity of a second end of the sensor support, there are connected an inlet duct for a sensor cooling fluid and an outlet duct for the cooling fluid, and the cooling fluid is caused to flow inside the sensor support;

the sensor support is fixed to a wall of the enclosure by fixing means which are preferably situated on the outside of the wall (relative to the enclosure), which support or fixing means are flexible, the first end of the support being put into contact with a "measurement" zone of the outside wall of the duct whose vibration is to be measured;

a substantially axial thrust force is applied to the sensor support along the longitudinal axis Y of the support towards the first end of the support and the contact zone between said end of the support and the duct, by thrust means such as magnetic, hydraulic, pneumatic, or mechanical thrust means;

where appropriate, an alarm and/or control signal is issued for controlling a vibration-generating member suitable for establishing vibration of the duct whose vibration is to be measured.

The solution to the problem posed also consists in providing apparatus for measuring the vibration of a duct disposed in a thermal enclosure and including a vibration sensor disposed inside the thermal enclosure.

The invention is applicable to methods and apparatuses for measuring vibration of a hollow body such as a duct (or such as a tube) located in an enclosure that is raised to a high temperature, such as the radiation enclosure of a furnace or the body of a heat exchange device (i.e. a heat exchanger) or of a tubular reactor.

The invention applies particularly to apparatuses for measuring the vibration of a duct disposed in a furnace fitted with heater means for heating a radiation zone, such as electrical heater means or burners fed with a fuel, which furnace is used for heating, gasifying, or thermally or chemically transforming a substance (or a product) or a mixture of substances, and the invention applies particularly to thermal cracking furnaces, and applies in particular to furnaces fitted with walls having orifices for fixing and/or passing burners.

In a preferred embodiment of the invention, the apparatus for measuring vibration of the duct disposed in the enclosure which is delimited by walls, comprises:

a sensor for measuring vibration of a zone of the duct;

a sensor cooling means;

a sensor support that is elongate along a first axis, Y, the support being in the form of a hollow and sealed tube or the like, which has a first end and a second end, the sensor being disposed (or fixed) inside said hollow support in the vicinity of said first end;

means for fixing said sensor support to a wall of the enclosure in a manner that is flexible in at least one direction parallel to the longitudinal axis of the support, whereby said support extends through an orifice provided in the wall of the enclosure, being "suspended" from the wall of the enclosure in such a manner that:

its longitudinal axis (said first axis, Y) extends substantially perpendicularly to the longitudinal axis, X, of the portion of the duct containing said measurement zone; and said first end of said support is placed in contact with the outside face of the wall of the duct in said measurement zone, such that said first end of the sensor support and said sensor are disposed inside the enclosure; and thrust (or pressure or prestress) means which exert on the support of the sensor a force directed towards the duct substantially along the longitudinal axis of the support, i.e. a force directed towards the measurement zone or towards the zone where the sensor support is thrust against the duct whose vibrations are to be measured.

In other preferred embodiments of the measurement apparatus:

said support is essentially constituted by a cylindrical case or tube including:

a first case defining in sealed manner a first cavity in which the vibration sensor is housed; and a second case defining a second cavity (or space or volume) receiving said first case;

the sensor cooling means may include two distinct sensor cooling circuits which comprise:

inlet ducts for a first cooling fluid which communicate with said second cavity defined by said second case, and corresponding outlet ducts for said first cooling fluid; and inlet and outlet ducts for a second cooling fluid leading to the inside of the support and enabling a second cooling fluid to flow inside said support and around said second case;

the apparatus further includes means for providing guidance in translation along the longitudinal Y axis of the sensor-supporting tube, e.g. including blades that form suspension springs and that also serve to guide the support.

In another aspect, the invention consists in a physical or chemical processing method in which one or more substances are caused to flow inside a duct disposed in a thermal enclosure and are physically or chemically processed inside said duct, and in which said duct is subjected to vibrations by a vibration generator in order to limit deposition of by-products inside the duct, wherein the vibrations of the duct are measured with a vibration sensor disposed inside the enclosure.

In another aspect, the invention provides an apparatus for physically or chemically processing one or more substances inside a duct, the apparatus comprising:

a thermal enclosure inside which said duct is disposed; and a vibration generator for vibrating said duct;

said apparatus including a duct vibration sensor disposed inside the enclosure.

A particular result of the invention is to provide furnaces for implementing chemical reactions, e.g. thermal cracking furnaces, which are fitted with apparatuses of the invention; the invention proposes the use of measurement apparatuses of the invention in methods of manufacturing one or more chemical products, such as a method of thermally cracking dichloro-1,2 ethane or a method of cracking a mixture of hydrocarbons and water vapor; where appropriate, a control signal is applied to a vibration generator as a function of a signal delivered by the vibration sensor.

The invention makes it possible to determine and control the level (amplitude) and/or the frequency of duct vibration necessary and/or sufficient for preventing by-products (such as coke formed in a thermal cracking reaction) being deposited inside the duct; the invention also makes it possible to perform vibration measurements in furnaces whose enclosures include ducts or nests of ducts, whether the furnace is in operation or stopped, thus making it possible to optimize control and use of duct vibration generators; generators may be constituted by burners fitted with valves that give rise to fluctuations in the feed rate of fuel to be burnt, which fluctuations can give rise to fluctuations or vibrations in the flames, in turn giving rise to vibrations of the furnace ducts, as described in document WO 92/11931; in another embodiment, a mechanical vibration generator may transmit vibrations to the duct through a connector (such as a rod) attached to said generator and to said duct.

By measuring vibration by contact or by conduction, it is possible to use sensors that are simple, cheap, and reliable in comparison with remote measurement systems (i.e. contactless systems), e.g. optical systems.

Because of the sensor cooling means, the invention makes it possible to take measurements under very severe conditions, in particular of temperature, which are incompatible with the high temperature behavior of vibration sensors that are generally available on the market, in particular piezoelectric sensors; by placing the sensor inside the enclosure it is possible to place it in the immediate proximity of and as close as possible to the vibrating duct, thus making it possible to perform measurements with good sensitivity, thereby making it possible to avoid complex mechanical interfaces which could give rise to severe levels of distortion between the phenomenon that is to be measured (i.e. duct vibration) and the phenomenon that is actually measured; in addition, by placing the accelerometer in the immediate proximity of the portion of duct whose vibration is to be measured, in particular whose acceleration is to be measured, and by deciding to use an accelerometer which has predominantly axial sensitivity or which is provided with good sensitivity along a plurality of axes, e.g. both axial and tangential sensitivity, or indeed which is sensitive along three axes, it is possible to perform measurements of duct vibration simultaneously along a plurality of axes.

The invention provides measurement apparatus which is easy to install (e.g. in a thermal cracking furnace), in particular by using a support tube for the vibration sensor, the tube being small in diameter and therefore capable of passing through an orifice that is likewise of small diameter and that is pierced through the wall of the enclosure (of the furnace), e.g. an orifice initially provided for installing a burner (or an orifice of the same design and having approximately the same dimensions); to this end, the diameter of the tubular sensor support is preferably less than 100 mm, e.g. being about 50 mm; installing the measurement apparatus requires no action or modification on the duct or on the enclosure.

The invention also provides apparatus for fixing in flexible manner (i.e. for suspending) the essentially rigid assembly constituted by the sensor and its tubular support extending through the wall of the enclosure, and having natural vibration frequencies which are directly associated with the stiffness (in particular the dynamic and the static stiffnesses) of the fixing means, making it possible to obtain a mount whose resonant frequencies do not lie in the measurement range, for example the resonant frequencies of the mounted assembly which are either less than 20 Hz, and in particular less than 10 Hz, or else are greater than at least 200 Hz, e.g. greater than 1000 Hz.

The invention also makes it possible to generate thrust forces between the inside end of the sensor support and the outside wall of the duct (or tube) that make it possible to ensure proper mechanical connection between the duct and the sensor over the frequency range under consideration, thereby enabling the vibration of the duct to be transmitted to the sensor.

According to a preferred characteristic, the apparatus of the invention includes two independent circuits conveying one or more cooling fluids, e.g. water, thus enabling the vibration sensor to be maintained at a temperature below 200° C. even though the temperature which is maintained inside the enclosure is of the order of 800° C. to 900° C., for example.

The means for processing the signal(s) delivered by the vibration sensor may be selected, for example, from the means proposed by the Bruel and Kjaer, which means can be analog and/or digital. They may include preamplifier means, digitizing means, computation means (e.g. means for timed weighting), recording means, and display means in particular.

BRIEF DESCRIPTION OF THE DRAWINGS

The numerous advantages provided by the invention will be better understood from the following description which refers to the accompanying drawings showing preferred embodiments of the invention without any limiting character whatsoever.

In the drawings, and unless stated to the contrary, elements that are identical or similar are given the same references from one figure to another.

FIG. 3 is a longitudinal section view on the longitudinal axis Y of the sensor support.

FIG. 2 is a section on II—II of FIG. 3.

MORE DETAILED DESCRIPTION

Figure 1:
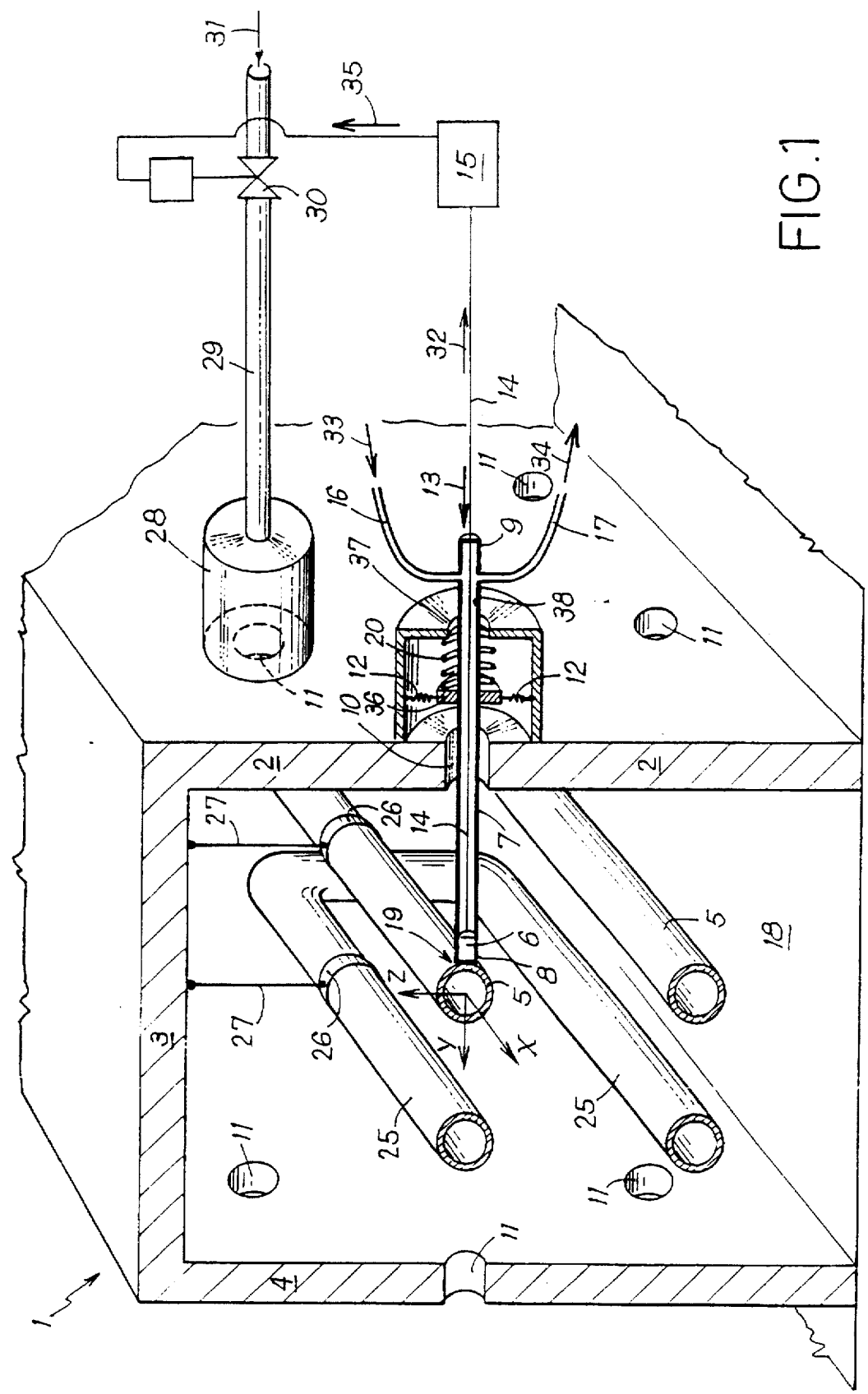
FIG. 1 is a diagrammatic perspective view of the main components of measurement apparatus of the invention implemented for measuring the vibration of ducts disposed in the enclosure of a thermal cracking furnace fitted with burners fed with fuel at a variable rate (e.g. at a pulsed rate).

With reference particularly to FIG. 1, the furnace 1 comprises a side wall 2, a top wall 3, and a side wall 4 disposed facing the wall 2, which walls define an enclosure 18 in which there extend ducts 5 and 25, inside which there flow chemicals.

The walls 2 and 4 of the furnace enclosure are fitted with orifices 11 for installing burners, such as the burner shown diagrammatically and referenced 28 in FIG. 1.

The ducts 5 and 25, may be bent to form one or more coils and they are fixed to the top wall 3 of the furnace 1 via collars 26 surrounding zones of the ducts, with the collars being connected to the wall 3 by fixing rods 27.

In the assembly shown diagrammatically in FIG. 1, the measurement device is intended to measure the vibration of a portion or zone 19 referred to as the "measurement" zone and constituting a portion of the duct 5 that extends locally along an axis X, e.g. a horizontal axis.

The measurement device comprises an accelerometer 6 disposed inside the cavity 38 defined by the walls of the support 7 for the sensor 6, which support 7 is generally in the form of an elongate tube along a longitudinal axis Y, e.g. a horizontal axis, perpendicular to the axis X.

The sensor 6 is positioned or fixed at the "inside" end 8 of the support 7 whose opposite "outside" end 9 is situated outside the furnace 1, the support 7 extending through an orifice 10 that is identical or similar to the orifices 11 provided through the walls of the furnace for mounting and operating burners such as the burner referenced 28. At least the portion of support 7 which is adjacent sensor 6 is within the walls 2, 3, 4 of furnace 1 and is exposed to heat provided in the furnace 1 by burners 28, as are the ducts 5 and 25.

Figure 3:
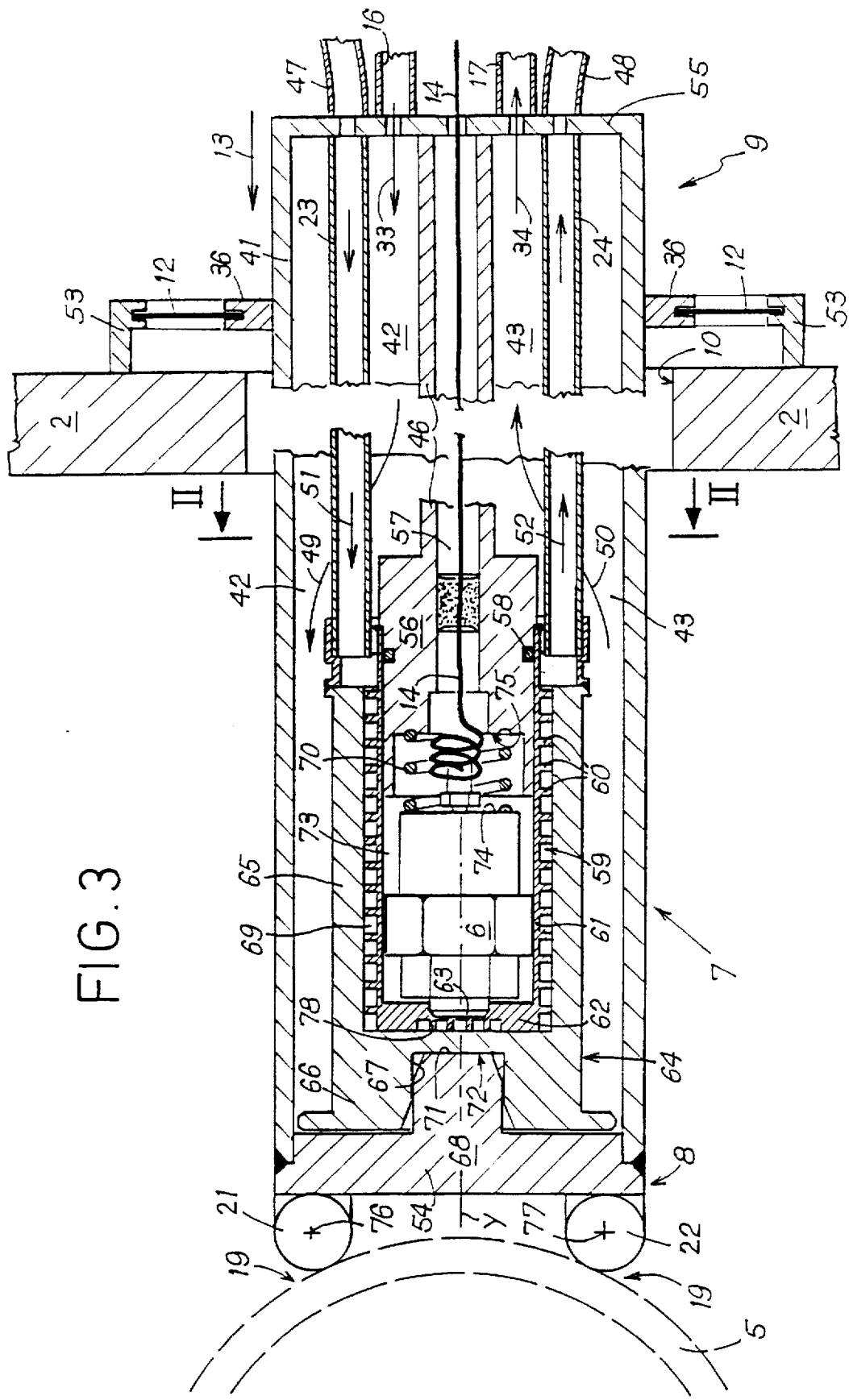

The sensor 6 is sensitive to vibration of the duct 5 because the end 8 of the support 7 is put into contact with and pressed against the measurement zone 19 forming a portion of the duct 5 by thrust means that exert a force on the support 7 in the direction of arrow 13 shown in FIGS. 1 and 3.

The sensor 6 delivers a signal 32 representative of the vibration of the zone 19 of the duct, which signal 32 is conveyed by a wire or cable 14 having a portion extending inside the support 7 to a signal processor unit 15, which unit 15 can be used where appropriate for delivering a signal 35 controlling operation of a valve 30 that generates pulses in the rate of fuel feed 31 via a duct 29 of a burner 28 of the furnace 1.

The sensor support 7 is mounted relative to the wall 2 of the furnace 1 by means of a flange 36 (also visible in FIG. 3) which is fixed rigidly to the outside of the tubular wall of the support 7, which flange is fixed to the wall 2 of the furnace 1 via suspensions or support means 12 such as spring blades providing suspension with a high degree of stiffness along the X and Z axes (where Z axis is vertical, for example) and very low stiffness along the longitudinal Y axis of the support 7 so as to define a natural vibration frequency of the assembly along the Y axis which is low (e.g. less than 20 Hz) so as to avoid disturbing the vibration of the duct 5 along said axis and the corresponding measurement.

As shown diagrammatically in FIG. 1, the force 13 exerted on the support 7 for guaranteeing that it presses against the zone 19 of the duct 5 may be obtained, for example, by a spring 20 bearing at one end against the flange 36 associated with the support 7 and at its other end against a plate 37 rigidly associated with the wall 2.

As shown diagrammatically by FIG. 1, a pipe 16 feeding water in the direction of arrow 33 for cooling the sensor 6 is connected and fixed to the end 9 of the support 7 and enables cooling water to be injected into the cavity 38 defined by the support, which water flows as far as the sensor 6 and then returns to the end 9 where it can escape via the outlet pipe 17 along arrow 34.

As shown more particularly in FIG. 3, in a preferred embodiment it is possible to use two independent circuits both carrying water, for example, to cool the vibration sensor 6.

Figure 2:
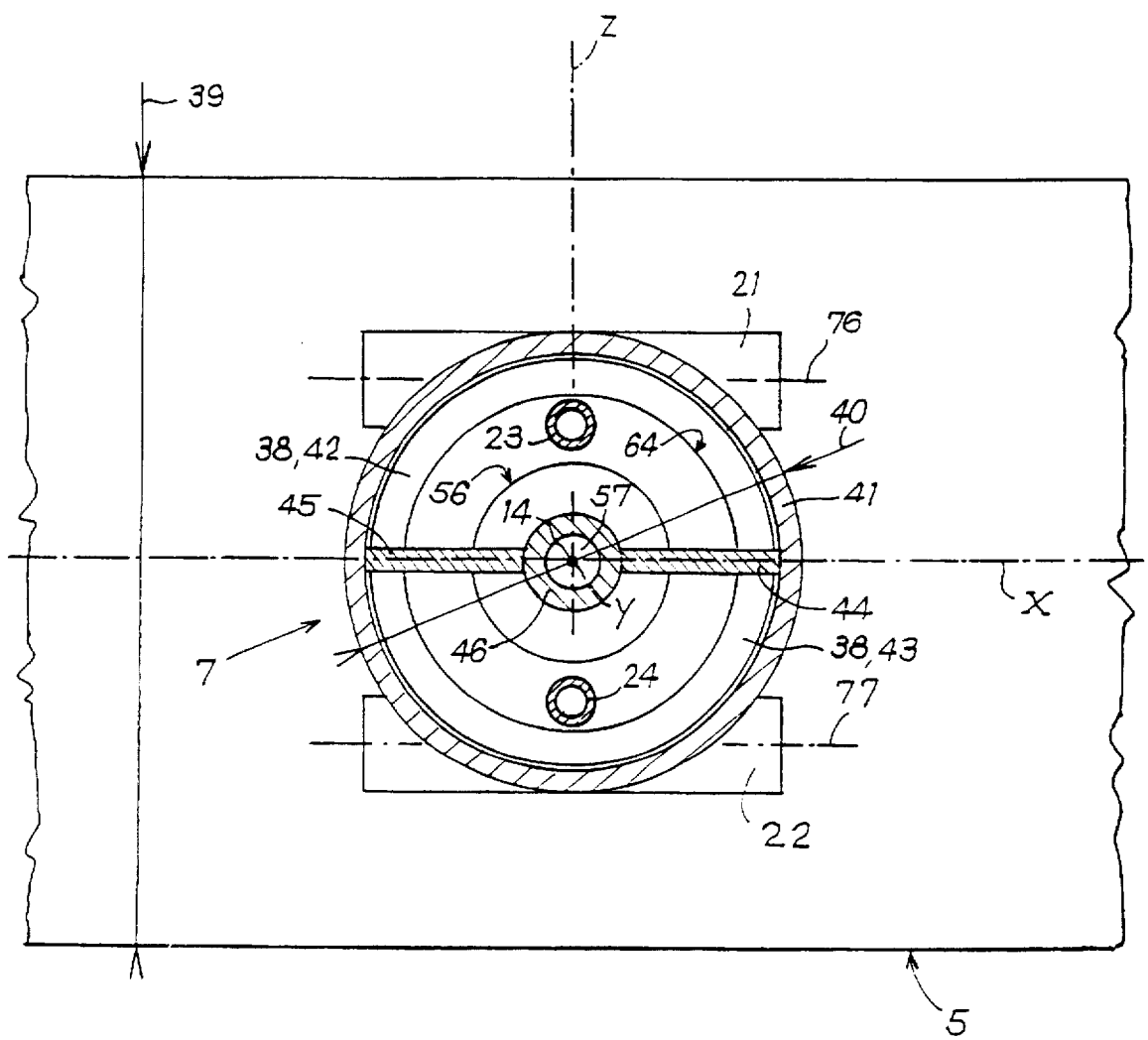
FIGS. 2 and 3 show a preferred embodiment of a sensor support and how it is mounted on the walls of a furnace in a particular embodiment of the invention.

The first circuit, already briefly outlined with reference to FIG. 1, and as also shown in FIG. 3, comprises said inlet pipe 16 which is preferably flexible, enabling water to be fed in the direction of arrow 33 to the inside of the support 7 defining a cavity referenced 38 which is subdivided as shown in FIGS. 3 and 2 in particular by partitions 44 and 45 that split said cavity 38 over a significant fraction of the length of the support or tube 7, i.e. between the external end 55 of the support 7 and the immediate vicinity of the sensor 6 and the housings surrounding it, thus providing a first cavity or duct 42 with water flowing therealong in the direction of arrow 49 so as to be conveyed to the housing 64 surrounding the sensor 6, and a second cavity 43; thereafter the cooling water flows in the direction of arrow 50 along the second cavity 43 and is exhausted from the support 7 along arrow 34, and then via a pipe 17.

The second cooling circuit comprises an inlet pipe 47, preferably a flexible hose, communicating via an orifice provided in the end wall 55 of the support 7 with an internal pipe 23 along which cooling water flows in the direction of arrow 51.

The water thus delivered by the second cooling circuit flows along a cavity 69 or space extending between a first housing 59 in which the sensor 6 is housed and said second housing 64, and is then evacuated along arrow 52 via a second pipe 24 which communicates via another orifice provided through the end wall 55 of the support 7 with a preferably flexible outlet pipe 48 for removing water from said second cooling circuit.

As shown mainly in FIGS. 1 and 3, the sensor 6, e.g. a piezoelectric accelerometer, delivers a signal 32 representative of the vibration to which it is subjected. This signal travels via a wire 14 (extending along the inside of a rigid sheath 46 extending to the end wall 55 of the housing which is pierced by an orifice through which said wire 14 passes), thereby connecting the sensor to a processor unit 15 shown in FIG. 1.

With reference particularly to FIG. 3, the sensor 6 is fixed by its base 63, e.g. a threaded base, in the end wall 62 constituting the end wall of a housing 59 which is provided not only with the end wall 62, but with side walls 61, e.g. circularly cylindrical walls, defining a cavity 73 receiving the sensor 6.

The cavity 73 (e.g. in communication with ambient air outside the furnace) is isolated by gaskets 58 in sealed manner from the cavities 38, 42, and 43 which are filled with water by the end 56 of the tube 46 that forms a sheath 57 for the wire 14.

The sensor 6 which may simply be centered by its base 63 in the end wall 62 can be held pressed against said end wall by a spring 70 that presses firstly against the top face 74 of the sensor 6 and secondly against a face 76 of the part 56 which is disposed facing the top face 74 of the sensor.

As explained above, the first housing 59 receiving the sensor 6 is cooled by the second cooling circuit having water flowing along arrows 51 and 52 and passing through the annular space 69 provided between the housing 59 and the housing 64 surrounding it.

Fins 60 are preferably provided on the outside face of the side walls 61 of the housing 59 to improve heat exchange between the housing 59 and the cooling fluid flowing along the cavity 69, and consequently to improve cooling of the sensor 6.

The second housing 64 surrounding the first housing 59 has a base or end wall 66 and side walls 65 which surround the side walls 61 of the first housing 69.

The housing 64 is provided with a blind hole 67 enabling the face 72 of the housing 64 to press against the face 71 of a stud or peg 68 forming a portion of the end wall 54 of the support 7 and closing the cylindrical wall 41 thereof at its inside end 8.

Two thrust pieces 21 and 22 are provided outside the end wall 54 and, as also shown in FIG. 2, are preferably in the form of circular section cylindrical bars extending respectively along two axes 76 and 77 which, when the sensor-support tube is in the measurement position, extend parallel to the longitudinal axis X of the duct 5 whose vibration is to be measured, such that a contact zone extending along a common generator line of the outside cylindrical surfaces of the duct 5 and each of the pieces 21 and 22 provides good transmission of vibration from the duct 5 to the thrust pieces 21 and 22, with said vibrations then being transmitted to the sensor 6 via the end wall 54 of the support 7, and the end wall 66 of the housing 64 via the contact interface 71, 72 and the end wall 62 of the housing 59.

As shown more particularly in FIG. 3, the end wall 62 of the housing 59 preferably also includes fins 78 for diminishing the intensity of the heat flux travelling by conduction from the outside of the support 7 to the sensor 6 via the generally metal masses of the parts 21, 22, 54, 66, and 62 which are necessarily in contact for the purpose of transmitting vibration, and which are consequently liable to pass heat by conduction.

As shown in FIG. 2 in particular, the diameter 40 of the cylindrical wall 41 of the sensor supporting tube 7 is less than the diameter 39 of the duct 5.

In the embodiment shown in FIG. 3, the force 13 thrusting the sensor support 7 against the duct 5 can result, at least in part, from the static pressure present in the cooling circuits, and the mounting (fixing) and guidance in translation along the Y axis of the sensor support 7 can be obtained by spring blades 12 fixed firstly to the flange 36 that is rigidly connected to the wall 41 of the support 7, and secondly to tabs 53 that are rigidly connected to the wall 2 of the furnace.

We claim:

1. A method of measuring the vibration of a duct disposed in a thermal enclosure in which duct there flows at least one fluid, in which method use is made of a vibration sensor disposed inside said thermal enclosure, said sensor being secured to a sensor support, said sensor support being pressed against said duct to enable and facilitate transmission of vibration by conduction from said duct to said sensor support, and from said sensor support to said sensor, at least the portion of the sensor support adjacent the sensor being within the thermal enclosure, and said duct and said portion of the sensor support being exposed to heat provided within said thermal enclosure, said sensor being cooled by a cooling fluid flowing within said sensor support.

2. A method according to claim 1, in which said sensor is cooled to keep said sensor at a temperature below 500° C.

3. A method according to claim 1, in which the acceleration of a zone of said duct is measured.

4. A method according to claim 1, in which:

said sensor is disposed in a first cavity provided at a first end of said sensor support;

an inlet pipe for sensor cooling fluid and an outlet pipe for said cooling fluid are connected to a second end of said sensor support;

said sensor support is fixed to a wall of said enclosure by flexible fixing means, said first end of said sensor support being put into contact with a zone of an outside wall of said duct whose vibration is to be measured;

a thrust force is applied to said sensor support;

said cooling fluid is caused to flow inside said sensor support;

signals delivered by said sensor are measured and processed; and where appropriate, an alarm and/or control signal is issued to control operation of duct vibration generator means.

5. A physical or chemical treatment method in which one or more substances are caused to flow inside a duct disposed in a thermal enclosure, and in which enclosure said duct is subjected to vibration, wherein vibrations of the duct are measured by a vibration sensor disposed inside said enclosure, said sensor being secured to a sensor support disposed at least partially within said enclosure, and said sensor support being pressed against said duct to enable and facilitate transmission of vibration by conduction from said duct to at least a portion of said sensor support, and from said sensor support to said sensor, said sensor being cooled by a cooling fluid flowing within said sensor support.

6. A method according to claim 5, in which signals delivered by said vibration sensor are measured and processed in a frequency range below 5000 Hz.

7. A method according to claim 5, for manufacturing one or more chemicals, in which a chemical reaction is performed by causing one or more reagents to flow inside said duct disposed in said enclosure.

8. Apparatus for physically or chemically treating one or more substances inside a duct, the apparatus comprising:

said duct disposed in a thermal enclosure; and a generator for establishing vibrations of said duct, the apparatus including a duct vibration sensor disposed inside the enclosure, cooling means for cooling said sensor, wherein said cooling means comprises at least one cooling circuit for cooling said sensor by means of a fluid, the apparatus further comprising a sensor support for said sensor and containing the cooling means for cooling said sensor, at least the portion of the sensor support adjacent the sensor being positioned within said enclosure, and thrust-generating means exerting a force on said sensor support in the direction of said duct.

* * * * *